Patented Nov. 27, 1923.

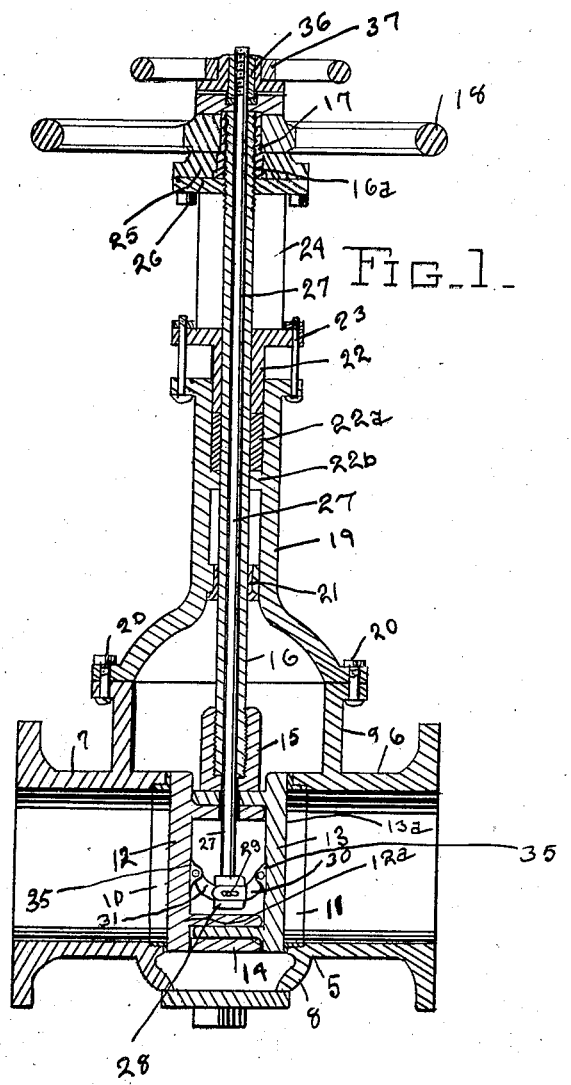

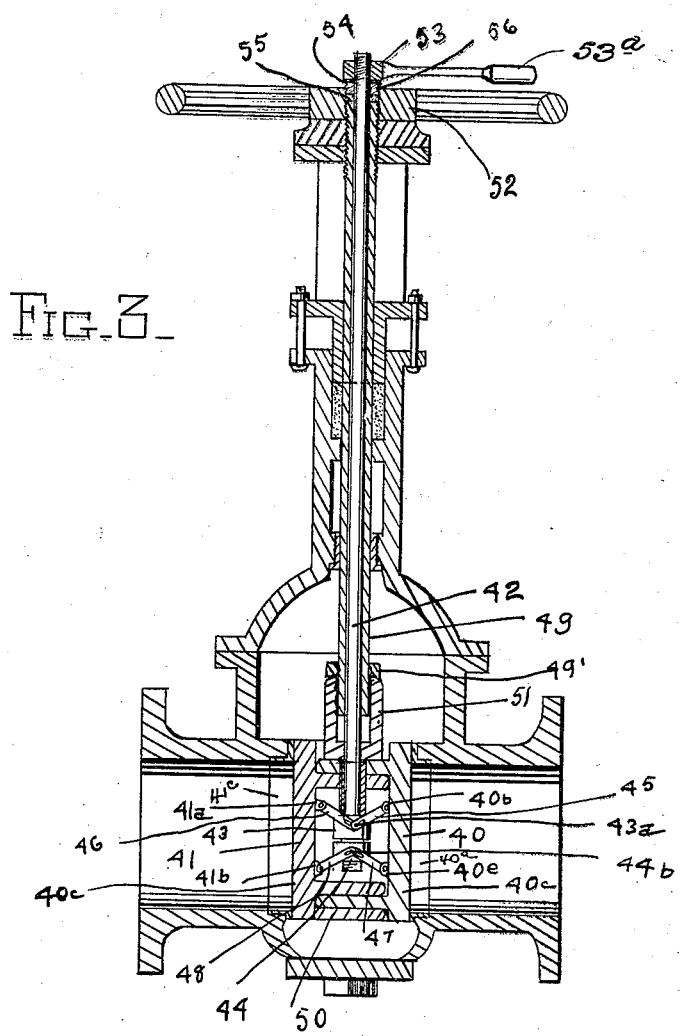
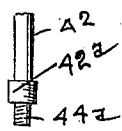

1,475,191

UNITED STATES PATENT OFFICE.

JOHN J. LEACH, OF INDIAN ORCHARD, MASSACHUSETTS.

GATE VALVE.

Application filed February 3, 1919, Serial No. 274,808. Renewed March 5, 1921. Serial No. 449,769.

*To all whom it may concern:*

Be it known that I, JOHN J. LEACH, a citizen of the United States of America, and resident of Indian Orchard, in the county of Hampden and State of Massachusetts, have invented certain new and useful Improvements in Gate Valves, of which the following is a full, clear, and exact description.

This invention relates to improvements in valves and particularly in means for taking up wear of the valve against its seat.

One of the objects of the invention is the provision of a valve, consisting of relatively movable parts working against a seat, and means for expanding said parts relative to each other, so as to take up wear due to the movement of the valve parts against the seat.

Another object of the invention is the provision of a valve, wherein the movable valve parts are positively connected to an operating screw, by means of links, whereby the movable valve parts will be prevented from becoming detached and injuring the turbine mechanism to which the feed line is connected.

Another object of the invention is the provision of a gate valve, wherein relatively movable valve parts are employed to work against the valve seat, with a screw rod working within the main valve screw rod, and connected by means of spreader links with the movable valve parts, whereby the valve parts may be pressed against the valve seat when it is necessary to take up wear, by operating the inner screw rod from the outside of the valve casing.

With the above and other objects in view the invention consists in certain new and useful combinations, constructions and arrangements of parts, clearly described in the following specification and fully illustrated in the accompanying drawings, in which:—

Fig. 1 is a vertical sectional view through a gate valve constructed in accordance with my invention.

Fig. 2 is a detail horizontal sectional view taken through the lower part of the smaller valve lock.

Fig. 3 is a detail view of the movable valve parts and the coupling sleeve or ring therefor.

Fig. 4 is a detail view in elevation of the lower end of the main operating shaft or rod.

Referring to the accompanying drawings, showing the application of the invention to a standard gate valve, such as is commonly employed for controlling the flow of steam, 5 designates the casing of the valve, which is formed with tubular end portions 6 and 7, designed to be connected to the feed line, as will be readily understood. This casing is formed with a downwardly offset flange 8 and an upstanding flange 9.

The casing 5 is formed with transverse valve seats 10 and 11, which are spaced apart from each other and disposed in parallel relation to each other. Against the valve seat 10 the movable valve element 12 works, and against the valve seat 11 the movable valve element 13 works. Each valve element comprises an end wall and a tubular flange or extension, the tubular flange or extension of the valve 12, being within a tubular flange or extension of the valve element 13. The valve element 12 is formed with a circular end wall 12$^a$ which engages the valve seat 10, and the valve element 13 is formed with a circular end wall 13$^a$ which engages the valve seat 11. A ring or coupling sleeve 14 embraces the interfitting tubular sections of the valve elements 12 and 13, and is equipped with an offset nipple 15 in which the lower end of the operating rod 16 is threaded or connected; this rod being shown to have external screw threads 16$^a$ along its upper end portion, which are engaged by the nut 17, enlarged to provide an operating wheel 18, by the turning of which the rod 16 will be shifted, so as to lift the valve elements 12 and 13 clear of the seat, or to return said elements to their seats.

On the flange 9 the case section 19 is mounted, being connected thereto by means of the bolts 20, as in the usual practice. The upper portion of this casing is reduced to provide a bearing for the operating rod 16, a bushing 21 being provided for this purpose. A gland 22 is provided on the upper end of the casing 19, being equipped with the screw bolts 23, whereby a steam tight joint may be provided around the rod 16, the packing 22$^a$ of said gland engaging the internal shoulder 22$^b$ formed on the casing 19.

On the casing 19 the standards 24 are connected, so as to provide a horizontal bearing 25 for the screw rod or shaft 16, and on this bearing 25 the plate 26 is connected, which serves to retain the nut 17 against the bearing plate 25, said nut having swiveled connection with the bearing 25.

Through the screw rod or shaft 16 a smaller rod 27 extends, and its lower end is equipped with a nut 28. This nut is provided with trunnions 29, which are engaged by the yokes 30 and 31, each yoke having slots 32 in its side arms, which receive the trunnions 29. The yokes 30 and 31 are provided with upwardly and outwardly inclined arms 33 which are pivotally secured to the ears or bearing lugs 34 and 35 of the valve elements 12 and 13.

A nut 36 is threaded on the upper end of the inner rod 27 and carries an operating element 37, which is shown to be in the form of a small wheel, but which may be a lever or any other similar device. By turning the operating element 37 the nut 28 will be lifted relatively to the valve elements 12 and 13 so that the valve elements will be moved more snugly against their seats.

The valve elements 12 and 13 are positively anchored to the inner screw rod, so that they will not become detached and under the high steam pressure forced out of the valve casing into the line.

In Figs. 3 and 4 I show a modified form of the invention, wherein the rod for operating the means for forcing the valves against their seat does not shift longitudinally, and companion nuts are employed to operate links for causing the valves to shift or move apart from each other to follow or take up wear.

Referring to the accompanying drawings, particularly Fig. 3, 40 designates the right valve and 41 the left valve, which work against the seats 40$^a$ and 41$^c$, respectively, in the manner previously described.

The valve 40 is equipped with bearing lugs or ears 40' and 40$^b$, arranged over each other, and the valve 41 is equipped with bearing lugs or ears 41$^a$ and 41$^b$ arranged over each other, each valve being of tubular formation and provided with an end wall 40$^c$, similar to that described with reference to Fig. 1.

An operating rod 42 extends downwardly between the valves and through the right nut 43 and the left nut 44. The rod 42 is provided with a threaded enlargement 42$^a$ designed to engage the nut 43, and is provided with a screw thread 44$^a$ designed to engage the nut 44.

The upper nut 43 is provided with trunnions 43$^a$ which are engaged by the upper yokes 45 and 46, the outer ends of which are pivotally connected to the lugs 40$^b$ on the member 40, and to the lugs 41$^a$ on the member 41, respectively. The lower nut 44 is provided with trunnions 44$^b$ which are engaged by the yokes 47 and 48, and the outer ends of these yokes are pivoted on the lugs 40$^c$ of the member 40 and the lugs 41$^b$ of the member 41, respectively.

The operating rod 42 extends through the sleeve shaft 49, the wheel nut 51 leading from the ring 50 on its upper end the latter surrounding the valves 40 and 41 whereby the shaft 49 may be lifted in the valve casing, so as to move the valves from their seats, or lowered to move the valve to their seats.

The yokes connected with the upper and lower nuts are preferably formed so that their outer ends widen toward the end walls of the valves, thus providing a wide bearing against the valves. The inner operating rod or shaft 42 is connected to the sleeve shaft 49 so that it will not shift longitudinally therein, and for this purpose a stop nut 49' is provided on the rod or shaft 42 for engaging the coupling ring 51, and thus limit the longitudinal movement of the inner rod 42.

The operating rod 42 is equipped with a nut 53 on its upper end, said nut being equipped with a lever 53$^a$ which enables the operator to turn the rod or shaft 42, so as to move the upper and lower nuts thereon, whereby the valves will be moved against their seats to take up wear.

It will be seen, therefore, that the rod 42 has little or no strain placed upon it, and that considerable leverage is developed between the nuts 43 and 44 and the valves, through the links connecting said nuts to the valves; it being understood that the arms of the yokes connected to the trunnions of the nuts are slotted as in the construction shown in Figs. 1 and 2.

The general construction of the valve casing for the valves 40 and 41 may follow the lines described with reference to the showing of Fig. 1, or otherwise, as judgment may direct.

Having described my invention, I claim:—

1. A valve construction including a valve casing having opposing valve seats, valves sliding against the seats, a shaft for moving the valves against their seats, another shaft, a nut on the other shaft, and links connecting the nut to the valves whereby the valves may be moved against their seats to take up wear, said links being connected to the valves so as to equally distribute pressure thereon and to effect a uniform lateral adjustment of the valves against the seats.

2. A valve construction consisting of a valve casing having spaced valve seats, interfitting valves sliding against the seats, a shaft, a coupling connecting the shaft to the valves, means for operating the shaft to move the valves against their seats, a shaft in the first shaft, nuts on the second shaft, and links connecting the nuts to the valves, the second shaft having right and left screw threaded engagement with the nuts, whereby said nuts will move in opposite directions when the shaft is rotated, so that the valves may be moved against their seats to take up wear.

3. A valve construction including a casing having opposing valve seats, valve members slidable on each other and slidable across the seats, a yoke embracing said valve members, a sleeve shaft coupled to said yoke, a bearing support for said sleeve shaft, an operating wheel threaded on the upper end of said sleeve shaft for shifting said shaft in said bearing support, a shaft extending through the sleeve shaft and formed with a lower end portion having right and left screwthreads, a nut threaded on the right screw threads of said lower end portion, a nut threaded on the left screw threads of said lower end portion, links connected with the first nut and the upper portions of said valve members, links connected with the second nut and the lower portions of said valve members and means for operating said last shaft, whereby the uniform adjustment of the valve members against the entire surfaces of the valve seats may be effected.

Signed by me at Springfield, Mass.

JOHN J. LEACH.